US012573147B2

(12) United States Patent (10) Patent No.: US 12,573,147 B2
Chen et al. (45) Date of Patent: Mar. 10, 2026

(54) LANDMARK DATA COLLECTION METHOD AND LANDMARK BUILDING MODELING METHOD

(71) Applicant: BYTEDANCE INC., Los Angeles, CA (US)

(72) Inventors: Zhili Chen, Los Angeles, CA (US); Linjie Luo, Los Angeles, CA (US); Xiao Yang, Los Angeles, CA (US); Jianchao Yang, Los Angeles, CA (US); Jing Liu, Los Angeles, CA (US); Guohui Wang, Los Angeles, CA (US)

(73) Assignee: BYTEDANCE INC., Los Angeles, CA (US)

( * ) Notice: Subject to any disclaimer, the term of this patent is extended or adjusted under 35 U.S.C. 154(b) by 305 days.

(21) Appl. No.: 18/251,229

(22) PCT Filed: Aug. 4, 2021

(86) PCT No.: PCT/CN2021/110598
§ 371 (c)(1),
(2) Date: Apr. 28, 2023

(87) PCT Pub. No.: WO2022/088821
PCT Pub. Date: May 5, 2022

(65) Prior Publication Data
US 2023/0401791 A1 Dec. 14, 2023

(30) Foreign Application Priority Data
Oct. 29, 2020 (CN) .......................... 202011177220.3

(51) Int. Cl.
*H04N 23/695* (2023.01)
*G06T 5/92* (2024.01)
(Continued)

(52) U.S. Cl.
CPC ................ *G06T 17/10* (2013.01); *G06T 5/92* (2024.01); *G06T 2200/08* (2013.01); *G06T 2207/20208* (2013.01)

(58) Field of Classification Search
CPC ....... G06T 17/10; G06T 5/92; G06T 2200/08; G06T 2207/20208; G06T 17/00;
(Continued)

(56) References Cited

U.S. PATENT DOCUMENTS 11,769,268 B1 * 9/2023 Post ........................ G06T 7/593
382/154
2005/0177350 A1 8/2005 Kishikawa
(Continued)

FOREIGN PATENT DOCUMENTS

CN 103198524 A 7/2013
CN 106296821 A 1/2017
(Continued)

OTHER PUBLICATIONS

Notice of Decision of Grant issued Jul. 1, 2023 in Chinese Application No. 202011177220.3, English translation (9 pages).
(Continued)

*Primary Examiner* — Xiao M Wu
*Assistant Examiner* — George Renze

(57) ABSTRACT

A landmark data collection method includes: determining (S100) a first basic collection point (A), a second basic collection point (B), and a third basic collection point (C) sequentially in an observation area of a landmark building; and collecting (S200) photos of the landmark building based on each of the first basic collection point (A), the second basic collection point (B), and the third basic collection point (C) to obtain landmark data of the landmark building. A photo of the landmark building is taken by a camera at the i-th basic collection point; and a collection point is deter-
(Continued)

mined at every predetermined distance interval as the camera is moved in a counterclockwise direction and/or a clockwise direction, and the photo of the landmark building is taken by the camera at the collection point, until the camera is moved out of the observation area, where i=1, 2, 3.

19 Claims, 3 Drawing Sheets

(51) Int. Cl.
 *G06T 17/00*          (2006.01)
 *G06T 17/10*          (2006.01)
 *H04N 5/00*          (2011.01)

(58) Field of Classification Search
 CPC ...... G06T 19/006; H04N 23/695; H04N 5/00; H04N 23/64
 See application file for complete search history.

(56)                References Cited

U.S. PATENT DOCUMENTS

| | | | | |
|---|---|---|---|---|
| 2013/0060540 | A1* | 3/2013 | Frahm | G06T 15/06 703/2 |
| 2017/0018113 | A1* | 1/2017 | Lattanzi | G06T 15/205 |
| 2017/0208245 | A1* | 7/2017 | Castillo | H04N 1/2104 |
| 2017/0249751 | A1* | 8/2017 | Indelman | G06F 18/24 |
| 2018/0107360 | A1* | 4/2018 | Kim | G06F 3/04817 |
| 2018/0335996 | A1* | 11/2018 | Chen | H04W 4/023 |
| 2019/0051041 | A1* | 2/2019 | Mills | H04N 9/3185 |
| 2019/0174056 | A1* | 6/2019 | Jung | H04N 1/00244 |
| 2020/0111250 | A1 | 4/2020 | Huang et al. | |
| 2021/0004595 | A1* | 1/2021 | Du | H04N 23/611 |
| 2021/0216786 | A1* | 7/2021 | Machida | H04N 23/62 |

FOREIGN PATENT DOCUMENTS

| | | |
|---|---|---|
| CN | 107103641 A | 8/2017 |
| CN | 109410327 A | 3/2019 |
| CN | 109801365 A | 5/2019 |
| CN | 109885630 A | 6/2019 |
| CN | 110505463 A | 11/2019 |
| CN | 110677828 A | 1/2020 |
| CN | 112233229 A | 1/2021 |
| KR | 101853490 B1 | 6/2018 |
| KR | 102050169 B1 | 12/2019 |

OTHER PUBLICATIONS

Han., S. et al., "Application of Oblique Photogrammetry in Large Scale Cadastral Mapping in Complex Area," Journal of Green Science and Technology, Jul. 2020, English Abstract (5 pages).
International Search Report issued Oct. 27, 2021 in International Application No. PCT/CN2021/110598, with English translation (8 pages).
Written Opinion for International Application No. PCT/CN2021/110598, mailed Oct. 27, 2021, 10 Pages.

* cited by examiner

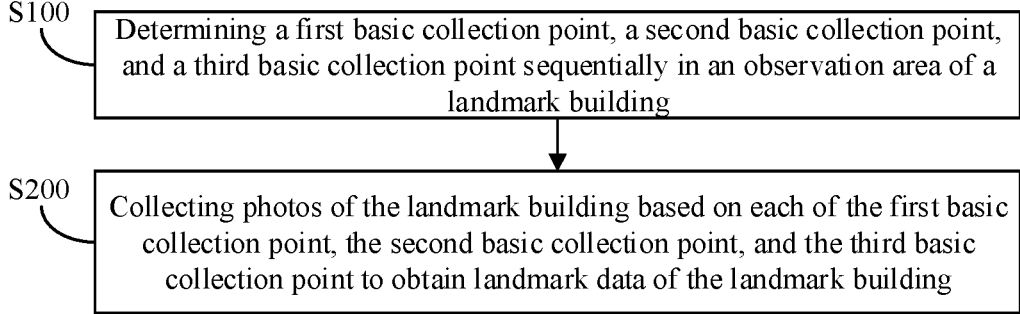

S100 — Determining a first basic collection point, a second basic collection point, and a third basic collection point sequentially in an observation area of a landmark building S200 — Collecting photos of the landmark building based on each of the first basic collection point, the second basic collection point, and the third basic collection point to obtain landmark data of the landmark building

FIG. 1

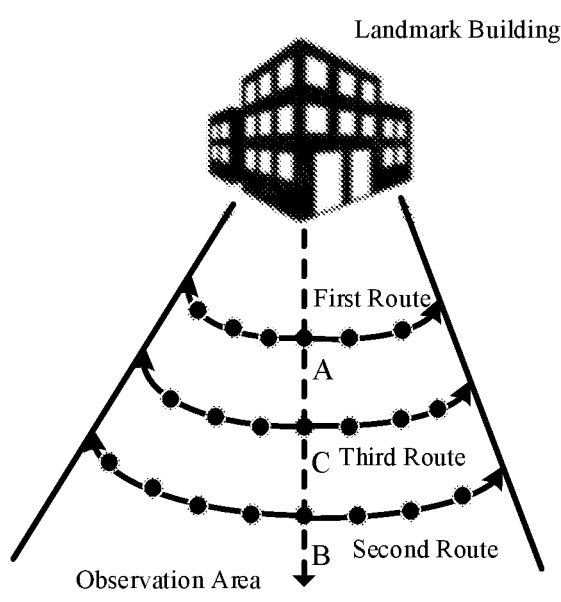

FIG. 2

Second Route

Third Route

First Route

Landmark Building

A

C

B

Observation Area w

H

Imaging of Landmark Building h

First Direction

Second Direction

W

Camera Picture

LANDMARK DATA COLLECTION METHOD AND LANDMARK BUILDING MODELING METHOD

The present application claims a priority of Chinese Patent Application No. 202011177220.3, entitled "Landmark Data Collection Method and Landmark Building Modeling Method" and filed on Oct. 29, 2020, which is incorporated herein by reference in its entirety.

TECHNICAL FIELD

The embodiments of the present disclosure relate to a landmark data collection method and a landmark building modeling method.

BACKGROUND

Short videos have the characteristics of strong social attributes, easy creation, and short duration, which are more in line with the fragmented content consumption habits of users in the mobile Internet times. Augmented Reality (AR) technology is a technology that ingeniously mixes virtual information with the real world, which widely uses various technical means, such as multimedia, three-dimensional (3D) modeling, real-time tracking and registration, intelligent interaction, and sensing, to simulate the virtual information, such as text, image, 3D model, music, and video, that is generated by the computer and to apply the simulated virtual information to the real world, so that the two kinds of information complement with each other, to "augment" the real world. AR's unique virtual and real mix special effect determines that it has unlimited expansion space in the field of short videos.

Currently, landmark AR special effect is one of the hot spots in the short video field. The landmark AR special effect may increase the fun of shooting, prompting the users to shoot and record more initiatively. The landmark AR special effect requires the use of collected landmark data to model landmark buildings. However, the landmark data collected by different collection methods have different effects on the efficiency and effect of the modeling.

SUMMARY

At least one embodiment of the present disclosure provides a landmark data collection method, including: determining a first basic collection point, a second basic collection point, and a third basic collection point sequentially in an observation area of a landmark building; and collecting photos of the landmark building based on each of the first basic collection point, the second basic collection point, and the third basic collection point to obtain landmark data of the landmark building. When a photo of the landmark building is taken by a camera at the first basic collection point, in a camera picture, at least one of a first ratio, of a size of imaging of the landmark building in a first direction to a size of the camera picture in the first direction, or a second ratio, of a size of the imaging of the landmark building in a second direction to a size of the camera picture in the second direction, is greater than or equal to 85%. When a photo of the landmark building is taken by the camera at the second basic collection point, in the camera picture, a ratio of a size of imaging of the landmark building in the first direction to the size of the camera picture in the first direction is approximately 45% to 55% of the first ratio. The third basic collection point is approximately a midpoint between the first basic collection point and the second basic collection point. The operation of collecting the photos of the landmark building based on the i-th basic collection point includes: taking a photo of the landmark building by the camera at the i-th basic collection point; and moving the camera in at least one of a counterclockwise direction or a clockwise direction in the observation area, with the i-th basic collection point being a starting point; and determining a collection point at every predetermined distance interval, and taking a photo of the landmark building by the camera at the collection point, until the camera is moved out of the observation area. During the movement of the camera, the camera faces the landmark building, and in the camera picture, a ratio of a size of imaging of the landmark building in the first direction to the size of the camera picture of the camera in the first direction remains substantially unchanged, where i=1, 2, 3.

For example, in the collection method provided by some embodiments of the present disclosure, when the photo of the landmark building is taken by the camera at each of the first basic collection point, the second basic collection point, and the third basic collection point, the camera faces substantially right to a main identification part of the landmark building, and in the camera picture, the imaging of the landmark building includes imaging of the main identification part.

For example, in the collection method provided by some embodiments of the present disclosure, the first direction is substantially parallel to a height direction of the imaging of the landmark building in the camera picture, and the second direction is substantially parallel to a width direction of the imaging of the landmark building in the camera picture.

For example, in the collection method provided by some embodiments of the present disclosure, the first direction is a vertical direction of the camera picture, and the second direction is a horizontal direction of the camera picture.

For example, in the collection method provided by some embodiments of the present disclosure, the observation area is not a 360-degree observation area; and the operation of moving the camera in at least one of the counterclockwise direction or the clockwise direction in the observation area, with the i-th basic collection point being the starting point; and determining the collection point at every predetermined distance interval, and taking the photo of the landmark building by the camera at the collection point, until the camera is moved out of the observation area includes: moving the camera in each of the counterclockwise direction and the clockwise direction in the observation area, with the i-th basic collection point being the starting point; and determining the collection point at every predetermined distance interval, and taking the photo of the landmark building by the camera at the collection point, until the camera is moved out of the observation area.

For example, in the collection method provided by some embodiments of the present disclosure, the observation area is a 360-degree observation area; and the operation of moving the camera in at least one of the counterclockwise direction or the clockwise direction in the observation area, with the i-th basic collection point being the starting point; and determining the collection point at every predetermined distance interval, and taking the photo of the landmark building by the camera at the collection point, until the camera is moved out of the observation area includes: moving the camera in the counterclockwise direction or the clockwise direction in the observation area, with the i-th basic collection point being the starting point; and determining the collection point at every predetermined distance interval, and taking the photo of the landmark building by the camera at the collection point, until the camera is moved back to the i-th basic collection point.

For example, in the collection method provided by some embodiments of the present disclosure, in the process of collecting the photos of the landmark building based on the i-th basic collection point, photos collected at two adjacent collection points have at least an 80% overlap area between each other.

For example, in the collection method provided by some embodiments of the present disclosure, in the process of collecting the photos of the landmark building based on the i-th basic collection point, in response to that the landmark building in a whole is not unable to be captured completely in one photo taken by the camera at any collection point, a plurality of photos are taken of the landmark building by rotating the camera at the collection point to capture the landmark building completely. Any two consecutive photos in the plurality of photos of the landmark building have at least a 50% overlap area between each other.

For example, in the collection method provided by some embodiments of the present disclosure, in the process of collecting the photos of the landmark building based on the i-th basic collection point, in a case where a photo X1 of the landmark building is collected at one of two adjacent collection points, and a plurality of photos of the landmark building are collected at the other one of the two adjacent collection points, at least one photo X2 in the plurality of photos of the landmark building collected at the other one of the two adjacent collection points has at least an 80% overlap area with the photo X1.

For example, in the collection method provided by some embodiments of the present disclosure, in the process of collecting the photos of the landmark building based on the i-th basic collection point, in a case where a plurality of photos of the landmark building are collected at each of two adjacent collection points, at least one photo X1 in the plurality of photos of the landmark building collected at one of the two adjacent collection points and at least one photo X2 in the plurality of photos of the landmark building collected at the other one of the two adjacent collection points have at least an 80% overlap area between each other.

For example, in the collection method provided by some embodiments of the present disclosure, in the process of collecting the photo of the landmark building based on the i-th basic collection point, the predetermined distance interval is an equal distance interval or an unequal distance interval.

For example, in the collection method provided by some embodiments of the present disclosure, in the process of collecting the photos of the landmark building based on the i-th basic collection point, a center point of the landmark building is taken as a vertex O, and an angle $\angle POQ$ formed by any two of adjacent collection points P and Q and the vertex O ranges from 1 degree to 1.5 degree.

For example, in the collection method provided by some embodiments of the present disclosure, in a case where a ratio of an illuminance of a light of the landmark building itself to an illuminance of sunlight is smaller than 0.5, the photos of the landmark building are collected based on the i-th basic collection point once every predetermined time interval, where i=1, 2, 3.

For example, in the collection method provided by some embodiments of the present disclosure, in a case where a ratio of an illuminance of a light of the landmark building itself to an illuminance of ambient light is greater than 0.8 but smaller than 1.2, the photos of the landmark building are collected based on the i-th basic collection point, where i=1, 2, 3; and in a case where the ratio of the illuminance of the light of the landmark building itself to the illuminance of the ambient light is greater than 2, the photos of the landmark building are collected based on the i-th basic collection point, where i=1, 2, 3.

For example, in the collection method provided by some embodiments of the present disclosure, wherein during the collection of the landmark data of the landmark building, a flash and a live function of the camera are kept off.

For example, in the collection method provided by some embodiments of the present disclosure, during the collection of the landmark data of the landmark building, a high dynamic range imaging function of the camera is kept on.

At least one embodiment of the present disclosure provides a landmark building modeling method, including: collecting the landmark data of the landmark building using the landmark data collection method according to any of the embodiments of the present disclosure, where the landmark data of the landmark building include the photos of the landmark building collected based on each of the first basic collection point, the second basic collection point, and the third basic collection point; and constructing a three-dimensional (3D) model of the landmark building based on the landmark data of the landmark building.

For example, in the modeling method provided by some embodiments of the present disclosure, the operation of constructing the 3D model of the landmark building based on the landmark data of the landmark building includes: processing the photos of the landmark building collected based on the first basic collection point, the photos of the landmark building collected based on the second basic collection point, and the photos of the landmark building collected based on the third basic collection point sequentially using a 3D reconstruction algorithm to construct the 3D model of the landmark building.

For example, in the modeling method provided by some embodiments of the present disclosure, the operation of processing the photos of the landmark building collected based on the i-th basic collection point using the 3D reconstruction algorithm includes: processing, in an order where the photos of the landmark building are collected based on the i-th basic collection point, the photos of the landmark building collected based on the i-th basic collection point sequentially using the 3D reconstruction algorithm to construct the 3D model of the landmark building.

BRIEF DESCRIPTION OF DRAWINGS

In order to explain the technical solutions of the embodiments of the present disclosure more clearly, the accompanying drawings of the embodiments will be briefly introduced below. Obviously, the drawings in the following description only relate to some embodiments of the present disclosure, without any limitation on the present disclosure.

FIG. 1 is a flowchart of a landmark data collection method according to at least one embodiment of the present disclosure;

FIG. 2 is a schematic diagram of a landmark data collection process according to some embodiments of the present disclosure;

DESCRIPTION OF EMBODIMENTS

Figures 3, 4:
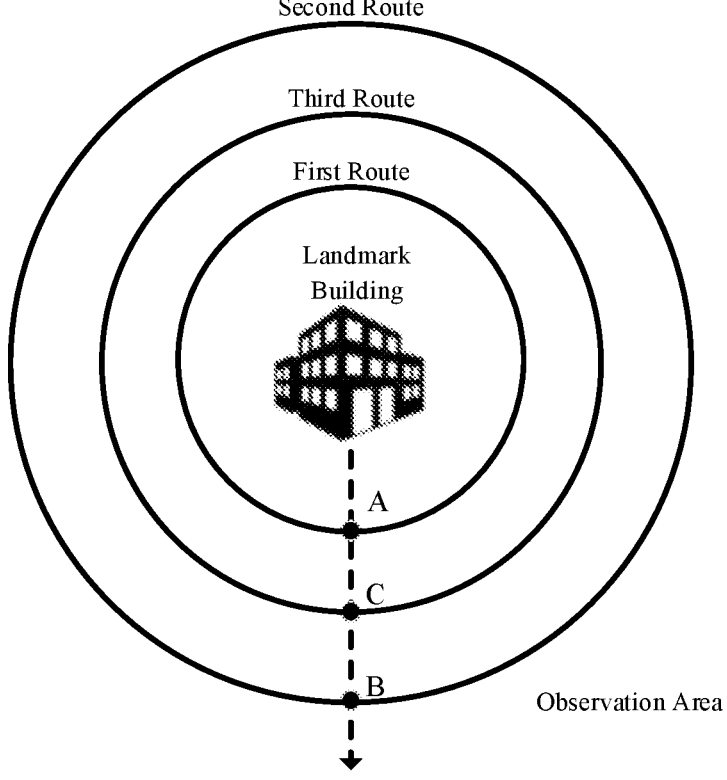
FIG. 3 is a schematic diagram of another landmark data collection process according to some embodiments of the present disclosure.
FIG. 4 is a schematic diagram of a kind of camera picture when the camera is used to take a photo of a landmark building at a first basic collection point according to some embodiments of the present disclosure.

In order to make the purposes, technical solutions and advantages of the embodiments of the present disclosure more clear, the technical solutions of the embodiments of the present disclosure will be clearly and completely described below with reference to the accompanying drawings of the embodiments of the present disclosure. Obviously, the described embodiments are some, but not all, embodiments of the present disclosure. All other embodiments obtained by the ordinary skilled in the art based on the described embodiments of the present disclosure without inventive efforts fall within the protection scope of the present disclosure.

Unless otherwise defined, technical or scientific terms used in the present disclosure shall have the general meanings as understood by the ordinary skilled in the art to which the present disclosure belongs. As used herein, "first", "second", and the like do not indicate any order, quantity, or importance, but are merely used to distinguish the various components. The term such as "including" or "containing" means that the elements or objects preceding it covers the elements or objects and their equivalents succeeding it, without excluding other elements or objects. The term such as "connecting" or "connected" is not limited to physical or mechanical connections, but may include electrical connections in a direct way or in an indirect way. The term such as "up", "down", "left", or "right" is only used to represent a relative positional relationship, which may change accordingly when the absolute position of the described object changes.

The present disclosure will be described below through several specific embodiments. In order to keep the following description of the embodiments of the present disclosure clear and concise, the present disclosure omits detailed descriptions of well-known functions and well-known components. When any component in the embodiments of the present disclosure appears in more than one drawing, the component is represented by the same or similar reference sign in each drawing.

With the popularity of digital products, especially smartphones, people may easily shoot and record various images and videos, such as short videos, etc. When people take photos of the landmark buildings, some application software (APPs) may detect and track landmark buildings based on a built-in 3D model of the application software, and at the same time, achieve various AR special effects easily and conveniently by combining with a lightweight rendering engine. In order to realize the landmark AR special effect, it is necessary to perform 3D reconstruction on the landmark building to obtain the 3D model of the landmark building.

Generally, the common 3D reconstruction methods, such as the 3D reconstruction method based on Structure From Motion (SFM), or the 3D reconstruction method based on deep learning, may be performed using images, such as photos, videos, etc. of the landmark building. However, arbitrarily obtained or collected landmark data (for example, photos, videos, etc. of the landmark buildings) may include a lot of bad data, which thus usually need to be preprocessed before being used for 3D reconstruction. In addition, the arbitrarily obtained or collected landmark data are usually chaotic and disordered, the use of which for 3D reconstruction may thus lead to low modeling efficiency.

At least one embodiment of the present disclosure provides a landmark data collection method. The collection method includes: determining a first basic collection point, a second basic collection point, and a third basic collection point sequentially in an observation area of a landmark building; and collecting photos of the landmark building based on each of the first basic collection point, the second basic collection point, and the third basic collection point to obtain landmark data of the landmark building. When a photo of the landmark building is taken by a camera at the first basic collection point, in a camera picture, at least one of a first ratio, of a size of imaging of the landmark building in a first direction to a size of the camera picture in the first direction, and a second ratio, of a size of the imaging of the landmark building in a second direction to a size of the camera picture in the second direction, is greater than or equal to 85%. When a photo of the landmark building is taken by the camera at the second basic collection point, in the camera picture, a ratio of a size of imaging of the landmark building in the first direction to the size of the camera picture in the first direction is approximately 45% to 55% of the first ratio. The third basic collection point is approximately a midpoint between the first basic collection point and the second basic collection point. The operation of collecting the photos of the landmark building based on the i-th basic collection point includes: taking a photo of the landmark building by the camera at the i-th basic collection point; and moving the camera in at least one of a counterclockwise direction or a clockwise direction in the observation area, with the i-th basic collection point being a starting point; and determining a collection point at every predetermined distance interval, and taking a photo of the landmark building by the camera at the collection point, until the camera is moved out of the observation area. During the movement of the camera, the camera faces the landmark building, and in the camera picture, a ratio of a size of imaging of the landmark building in the first direction to the size of the camera picture in the first direction remains substantially unchanged, where i=1, 2, 3.

Some embodiments of the present disclosure also provide a landmark building modeling method corresponding to the above-mentioned landmark data collection method. With the landmark data collection method provided by the embodiments of the present disclosure, the landmark data of the landmark building may be collected based on three basic collection points respectively in a short range, a medium range, and a long range respectively (collecting the photos of the landmark building based on the first basic collection point corresponding to the short-range collection process, collecting the photos of the landmark building based on the third basic collection point corresponding to the medium-range collection process, and collecting the photos of the landmark building based on the second basic collection point corresponding to the long-range collection process), and 3D reconstruction is performed using the landmark data, which may improve the modeling effect. In addition, since the collected landmark data are in order, compared with using arbitrary obtained or collected chaotic and disordered landmark data, using the ordered landmark data for the 3D reconstruction may improve the modeling efficiency.

Some embodiments of the present disclosure and examples thereof will be described in detail below with reference to the accompanying drawings. It should be understood that the particular embodiments described herein are only used to illustrate and explain the present disclosure, but not used to limit the present disclosure.

FIG. 1 is a flowchart of a landmark data collection method according to at least one embodiment of the present disclosure. For example, as shown in FIG. 1, the collection method includes steps S100 to S200.

In step S100, a first basic collection point, a second basic collection point, and a third basic collection point are determined sequentially in an observation area of a landmark building.

For example, in some embodiments, a landmark building has rich and unique visual features. For example, in some examples, the landmark building has a prominent and characteristic texture or outline, and is distinct from the buildings around it. For example, in some other examples, the landmark building has an irregular structure (e.g., a logo, etc.), or the landmark building has less repetitive features, or the landmark building has lower symmetry (e.g., lacking rotational symmetry, etc., but having axisymmetry at one or some viewing angles). For example, in some other examples, the local feature of the landmark building is also sufficiently representative. For example, the landmark building may be identified by identifying the local feature.

For example, in some embodiments, the landmark building also has a relatively stable visual appearance. For example, in some examples, the landmark building has no or less easily-reflective surfaces. For example, the easily-reflective surface includes a glass mirror surface, a smooth metal surface, etc. that is easily reflective. For example, in some other examples, the landmark building has no or less dynamic effect. For example, for a landmark building with a large Light Emitting Diode (LED) screen on its outer wall, it is usually necessary to collect its landmark data when the large LED screen does not work or is playing a relatively stable picture. In some other examples, the landmark building does not have a structure that may change at any time. For example, for a landmark building with a scaffolding under maintenance, it is usually necessary to collect its landmark data after the scaffolding is removed after the maintenance.

For example, in some embodiments, the landmark building also has a suitable observation area. For example, in some examples, when a photo of the landmark building is taken by a camera in the observation area of the landmark building, the entire or most part of the landmark building may be seen through the lens of the camera, while the imaging of the landmark building in the camera picture occupies not a small part of the picture. For example, in some examples, when a photo of the landmark building is taken by the camera in the observation area of the landmark building, the background of the landmark building is relatively simple, e.g., the background of the landmark building is a sky background, etc. For example, in some examples, there is no obstacle or there are only a small number of the obstacles in the observation area of the landmark building that would affect taking the photo of the landmark building. That is to say, the photo of the landmark building that satisfies the requirement may be taken at most places in the observation area of the landmark building.

For example, in some embodiments, the landmark building typically has one or more of the above-mentioned characteristics, in order to collect the landmark data, construct the 3D model, and further apply the 3D model (e.g., achieving the landmark AR effects, etc.). It should be noted that the present disclosure is not limited to these.

FIG. 2 is a schematic diagram of a landmark data collection process according to some embodiments of the present disclosure, and FIG. 3 is a schematic diagram of another landmark data collection process according to some embodiments of the present disclosure. For example, FIG. 3 shows a landmark data collection process in a case where the observation area of the landmark building is a 360-degree observation area in the horizontal plane, while FIG. 2 shows a landmark data collection process in a case where the observation area of the landmark building is not a 360-degree observation area in the horizontal plane (for example, the observation area of the landmark building is, but not limited to, a fan-shaped observation area in the horizontal plane).

For example, with reference to FIG. 2 and FIG. 3, in the landmark data collection process, the first basic collection point A, then the second basic collection point B, and finally the third basic collection point C may be determined in the observation area of the landmark building.

Figure 5:
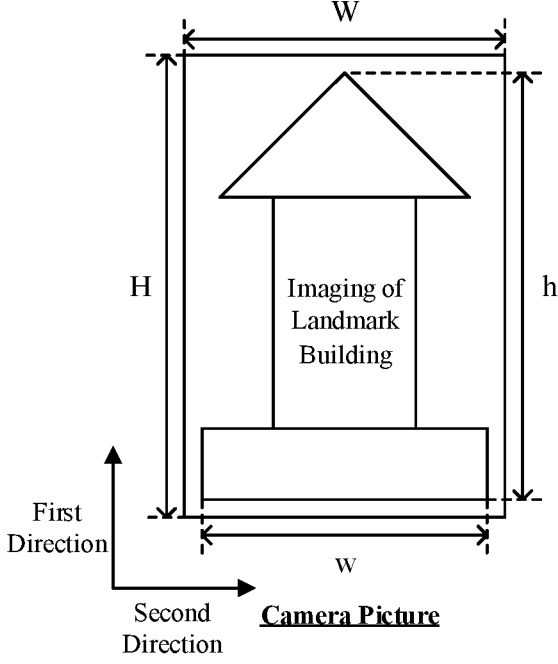
FIG. 5 is a schematic diagram of another kind of camera picture when the camera is used to take a photo of a landmark building at a first basic collection point according to some embodiments of the present disclosure.

FIG. 4 is a schematic diagram of a kind of camera picture when the camera is used to take a photo of a landmark building at the first basic collection point according to some embodiments of the present disclosure, and FIG. 5 is a schematic diagram of another kind of camera picture when the camera is used to take a photo of the landmark building at the first basic collection point according to some embodiments of the present disclosure. For example, in some embodiments, as shown in FIG. 4 and FIG. 5, when a photo of the landmark building is taken by the camera at the first basic collection point, in the camera picture, at least one of a first ratio h/H, of a size h of imaging of the landmark building in the first direction to a size H of the camera picture in the first direction, and a second ratio w/W, of a size w of the imaging of the landmark building in the second direction to a size W of the camera picture in the second direction, is greater than or equal to 85%. For example, the first direction and the second direction cross each other. For example, the first direction and the second direction are perpendicular to each other. For example, in some examples, as shown in FIG. 4 and FIG. 5, the first direction is generally substantially in parallel to the height direction of the imaging of the landmark building in the camera picture, and the second direction is generally substantially in parallel to the width direction of the imaging of the landmark building in the camera picture. The embodiments of the present disclosure include, but not limited to, any of these examples. For example, in some examples, as shown in FIG. 4 and FIG. 5, the first direction may be the vertical direction of the camera picture, and the second direction may be the horizontal direction of the camera picture. The embodiments of the present disclosure include, but not limited to, any of these examples. For example, in some embodiments, a location in the observation area that meets the above photo-taking requirement may be determined as the first basic collection point A.

For example, in some embodiments, when a photo of the landmark building is taken by the camera at the second basic collection point, in the camera picture, a ratio of a size of imaging of the landmark building in the first direction to the size of the camera picture in the first direction is approximately 45% to 55% of the first ratio h/H. For example, in some embodiments, a location in the observation area that meets the above photo-taking requirement may be determined as the second basic collection point B.

For example, in some embodiments, the third basic collection point is approximately a midpoint between the first basic collection point and the second basic collection point.

That is, the midpoint between the first basic collection point and the second basic collection point and any location near the midpoint in the observation area may be determined as the third basic collection point C.

For example, in some embodiments, the landmark building usually has a main identification part. For example, the main identification part is usually a unique feature of the landmark building. The landmark building may be identified by detecting the main identification part. For example, in some examples, the main identification part of the landmark building is usually an overall outline of the landmark building (for example, the overall outline of the landmark building from a certain viewing angle, etc.). For example, in some other examples, the main identification part of the landmark building may be a local feature unique to the landmark building (e.g., a logo, etc.).

For example, in some embodiments, when the photo of the landmark building is taken by the camera at each of the first basic collection point, the second basic collection point, and the third basic collection point, the camera faces substantially right to the main identification part of the landmark building, and in the camera picture, the imaging of the landmark building includes imaging of the main identification part. For example, in some specific examples, with reference to FIG. 2 and FIG. 3, when the first basic collection point A is determined in the observation area, the camera faces substantially right to the main identification part of the landmark building. In this case, the camera may be moved from the first basic collection point along a direction away from the landmark building (as shown in a direction of the dotted line with an arrow in FIG. 2 and FIG. 3, for example, the direction may be an extension direction of a line connecting the center point of the landmark building and the first basic collection point). The camera is kept to face substantially right to the main identification part of the landmark building during the movement, until the ratio of the size of the imaging of the landmark building in the first direction to the size of the camera picture in the first direction is approximately 45% to 55% of the first ratio. Then, the movement of the camera is stopped, and the current position where the camera is located is determined as the second basic collection point B. Then, the third basic collection point C may be determined near the midpoint of the first basic collection point A and the second basic collection point B.

In step S200, the photos of the landmark building are collected based on each of the first basic collection point, the second basic collection point, and the third basic collection point, so as to obtain the landmark data of the landmark building.

For example, in some embodiments, the process of collecting the photos of the landmark building based on each of the first basic collection point, the second basic collection point, and the third basic collection point is basically the same. For example, in some embodiments, the operation of collecting the photos of the landmark building based on the i-th basic collection point includes the following steps S210 to S220.

In step S210, a photo of the landmark building is taken by the camera at the i-th basic collection point.

In step S220, the camera is moved in at least one of a counterclockwise direction or a clockwise direction in the observation area, with the i-th basic collection point being a starting point; and a collection point is determined at every predetermined distance interval, and a photo of the landmark building is taken by the camera at the collection point, until the camera is moved out of the observation area.

For example, in some embodiments, during the movement of the camera, the camera faces the landmark building, and in the camera picture, the ratio of the size of imaging of the landmark building in the first direction to the size of the camera picture in the first direction remains substantially unchanged. It should be understood that in the process of moving the camera in the counterclockwise direction or the clockwise direction and taking the photos of the landmark building, the photos of the landmark building are taken sequentially in time at the respective collection points (including the basic collection points). If the photos of the landmark building taken in the above process are regarded as a photo sequence according to the sequence of the photo-taking times, the photos of the landmark building taken at two adjacent collection points in the moving route of the camera also have an adjacent relationship in the photo sequence. Therefore, the landmark data collected according to the landmark data collection method according to the embodiments of the present disclosure are in order.

For example, in some examples, as shown in FIG. 2, the observation area of the landmark building is not a 360-degree observation area in the horizontal plane (for example, the observation area of the landmark building is, but not limited to, a fan-shaped observation area in the horizontal plane). In this case, step S220 may include: moving the camera in each of the counterclockwise direction and the clockwise direction in the observation area, with the i-th basic collection point being the starting point (e.g., the moving route in the counterclockwise direction is shown as the branches on the right side of the corresponding basic collection points in the first to the third routes in FIG. 2, and the moving route in the clockwise direction is shown as the branches on the left side of the corresponding basic collection points in the first to the third routes in FIG. 2); and determining a collection point at every predetermined distance interval (as shown by the black dots except the basic collection points in the first to third routes in FIG. 2), and taking the photo of the landmark building by the camera at the collection point, until the camera is moved out of the observation area. In this case, in the process of collecting the photos of the landmark building based on each basic collection point, since at least one photo of the landmark building is collected at each collection point (including the basic collection point), a set of photos of the landmark building may finally be collected. In addition, since there are 3 basic collection points, each time the landmark data collection method according to the embodiments of the present disclosure is performed, a group of photos of the landmark building may be collected, and the group of photos includes three sets of photos respectively corresponding to the three basic collection points, i.e., the first basic collection point, the second basic collection point, and the third basic collection point. For example, in some examples, as shown in FIG. 2, the first to the third routes are all substantially arc-shaped. Of course, it should be understood that the arc shape may not be a standard circular arc.

For example, in some embodiments, as shown in FIG. 2, the photos of the landmark building may be taken in a short-range based on the first basic collection point A (for example, the first basic collection point A being the starting point) along the first route (the counterclockwise direction and the clockwise direction, respectively) to obtain a set of short-range photos of the landmark building; the photos of the landmark building may be taken in a long-range based on the second basic collection point B (for example, the second basic collection point B being the starting point) along the second route (the counterclockwise direction and the clockwise direction, respectively) to obtain a set of long-range photos of the landmark building; and the photos of the landmark building may be taken in a medium-range based on the third basic collection point C (for example, the third basic collection point C being the starting point) along the third route (the counterclockwise direction and the clockwise direction, respectively) to obtain a set of medium-range photos of the landmark building. It should be understood that the present embodiment does not limit to the collection order of the above three sets of photos.

For example, in some examples, as shown in FIG. 3, when the observation area of the landmark building is a 360-degree observation area in the horizontal plane, step S220 may include: moving the camera in the counterclockwise direction or the clockwise direction in the observation area, with the i-th basic collection point being the starting point (for example, the moving route is shown in any of the first to the third routes in FIG. 3); and determining a collection point (not shown in FIG. 3) at every predetermined distance interval, and taking the photo of the landmark building by the camera at the collection point, until the camera is moved back to the i-th basic collection point. In this case, similar to the example shown in FIG. 2, in the process of collecting the photos of the landmark building based on each basic collection point, since at least one photo of the landmark building is collected at each collection point (including the basic collection point), a set of photos of the landmark building may finally be collected. In addition, since there are 3 basic collection points, each time the landmark data collection method according to the embodiments of the present disclosure is performed, a group of photos of the landmark building may be collected, and the group of photos includes three sets of photos respectively corresponding to the three basic collection points, i.e., the first basic collection point, the second basic collection point, and the third basic collection point. For example, in some examples, as shown in FIG. 3, the first to the third routes are all substantially ring-shaped. Of course, it should be understood that the ring shape may not be a standard circular ring.

For example, in some embodiments, as shown in FIG. 3, the photos of the landmark building may be taken in a short-range based on the first basic collection point A (for example, the first basic collection point A being the starting point) along the first route (the counterclockwise direction or the clockwise direction) to obtain a set of short-range photos of the landmark building; the photos of the landmark building may be taken in a long-range based on the second basic collection point B (for example, the second basic collection point B being the starting point) along the second route (the counterclockwise direction or the clockwise direction) to obtain a set of long-range photos of the landmark building; and the photos of the landmark building may be taken in a medium-range based on the third basic collection point C (for example, the third basic collection point C being the starting point) along the third route (the counterclockwise direction or the clockwise direction) to obtain a set of medium-range photos of the landmark building. It should be understood that the present embodiment does not limit to the collection order of the above three sets of photos, either.

It should be noted that, in the embodiments of the present disclosure, "short-range", "medium-range", and "long-range" all refer to the relative distances between each collection point and the landmark building, respectively. For example, each collection point (including the first basic collection point A) in the first route where the first basic collection point A is located is relatively close to the landmark building, and thus, each collection point in the first route is in a short range; each collection point (including the second basic collection point B) in the second route where the second basic collection point B is located is far away from the landmark building, and thus, each collection point in the second route is in a long range; and each collection point (including the third basic collection point C) in the third route where the third basic collection point C is located is in a medium distance from the landmark building, and thus, each collection point in the third route is in a medium range.

For example, in some embodiments, in the process of collecting the photos of the landmark building based on the i-th basic collection point (i=1, 2, 3), the predetermined distance interval may be an equal distance interval, or may be an unequal distance interval. For example, in some examples, the observation area includes a first area and a second area, where most people tend to take photos of the landmark building in the first area, and a few people tend to take photos of the landmark building in the second area. In this case, the collection points located in the first area in the route corresponding to the i-th basic collection point (i=1 corresponding to the first route, i=2 corresponding to the second route, and i=3 corresponding to the third route) may be relatively densely distributed, while the collection points located in the second area in the route corresponding to the i-th basic collection point may be relatively sparsely distributed. It should be noted that the embodiments of the present disclosure include, but not limited to, this. It should also be understood that the distance intervals between the collection points in different routes may be the same or different, which is not limited by the embodiment of the present disclosure.

For example, in some examples, in the process of collecting the photos of the landmark building based on the i-th basic collection point (i=1, 2, 3), the center point of the landmark building is taken as an vertex O, and the angle $\angle POQ$ formed by any two adjacent collection points P and Q in the route corresponding to the i-th basic collection point and the vertex O ranges from 1 degree to 1.5 degree. In this case, if the observation area of the landmark building is a 360-degree observation area in the horizontal plane (as shown in FIG. 3), each route (the first route, the second route, or the third route) may include 240 to 360 collection points (including the basic collection point).

For example, in some embodiments, in the process of collecting the photos of the landmark building based on the i-th basic collection point, the photos collected at two adjacent collection points have at least an 80% overlap area between each other. That is to say, at least the 80% area shown on the photo collected at one of the two adjacent collection points is also shown on the photo collected at the other one of the two adjacent collection points. Therefore, the landmark data collected according to the collection method provided by the embodiments of the present disclosure have a certain continuity. When the landmark data are used for 3D reconstruction, the modeling efficiency may be improved, and the modeling effect may be improved at the same time.

For example, in some embodiments, in the process of collecting the photos of the landmark building based on the i-th basic collection point, there may be a problem that the landmark building is unable to be captured completely in one photo at some collection points, especially in the case of photo-taking in the short-range (that is, the collection points being in the first route). In order to deal with the above-mentioned possible problem, the collection method according to the embodiments of the present disclosure may further include: in the process of collecting the photos of the landmark building based on the i-th basic collection point, in response to that the landmark building is not unable to be captured completely in one photo taken by the camera at any one collection point, taking a plurality of photos of the landmark building by rotating the camera at the collection point to capture the photo of the landmark building completely. Any two consecutive photos in the plurality of photos of the landmark building have at least a 50% overlap area between each other. As such, the integrity of the collected landmark data may be guaranteed.

For example, in some examples, in a case where a photo X1 of the landmark building is collected at one of two adjacent collection points, and a plurality of photos of the landmark building are collected at the other one of the two adjacent collection points, the photos collected at the two adjacent collection points having at least an 80% overlap area between each other as described previously means that at least one photo X2 in the plurality of photos of the landmark building collected at the other one of the two adjacent collection points has at least an 80% overlap area with the photo X1. For example, in some other examples, in a case where a plurality of photos of the landmark building are collected at each of the two adjacent collection points, the photos collected at the two adjacent collection points having at least an 80% overlap area between each other as described previously means that at least one photo X1 in the plurality of photos of the landmark building collected at one of the two adjacent collection points and at least one photo X2 in the plurality of photos of the landmark building collected at other one of the two adjacent collection points have at least an 80% overlap area between each other.

For example, in some embodiments, at different times during the daytime, with different angles of illumination of sunlight, the shadows cast by the landmark building on itself and the shadows cast by the surrounding buildings on the landmark building may be quite different. In order to guarantee the integrity of the collected landmark data, the collection method according to the embodiments of the present disclosure may include: in a case where a ratio of an illuminance of a light of the landmark building itself to an illuminance of sunlight is smaller than 0.5 (e.g., at the daytime), collecting the photos of the landmark building based on the i-th basic collection point once every predetermined time interval, where i=1, 2, 3. For example, at the daytime, the light of the landmark building itself usually remains off (that is, the illuminance of its light is usually close to 0), while the illuminance of the sunlight may usually reach more than 1000 Lux. For example, in some examples, at the daytime, the step S200 may be repeated once every two hours to obtain a group of photos of the landmark building, where each group of photos includes three sets of photos respectively corresponding to the basic collection points (i.e., the first basic collection point, the second basic collection point, and the third basic collection point). That is, at the daytime, multiple groups of photos of the landmark building may usually be collected as the landmark data. For example, the above predetermined time interval may be an equal time interval or an unequal time interval, which is not limited in the embodiments of the present disclosure. It should be understood that, in the embodiments of the present disclosure, the above-mentioned predetermined time interval may be set as required, and is not limited to two hours in the above example.

For example, in some embodiments, the visual effects of the landmark building (especially a landmark building with lighting effects itself) may be quite different between at the daytime and at night. In order to guarantee the integrity of the collected landmark data, the collection method according to the embodiments of the present disclosure may generally further include: in a case where a ratio of the illuminance of the light of the landmark building itself to an illuminance of ambient light is greater than 0.8 but smaller than 1.2 (for example, at dusk when a part of the lights of the landmark building is just turned on), collecting the photos of the landmark building based on the i-th basic collection point, where i=1, 2, 3; and in a case where the ratio of the illuminance of the light of the landmark building itself to the illuminance of the ambient light is greater than 2 (for example, in the night when all the lights of the landmark buildings are basically on), collecting the photos of the landmark building based on the i-th basic collection point, where i=1, 2, 3. For example, at dusk, the illuminance of the light of the landmark building itself is approximately equal to the illuminance of the ambient light, and the ambient light at this time usually includes the sunlight, the street lights around the landmark building, and the lights of the building; and in the night, the illumination of the landmark building itself is obviously greater than that of the ambient light, and the ambient light at this time usually includes the moonlight, the starlight, the street lights around the landmark building, and the lights of the building. That is, at night (when a part of the lights of the landmark building are just turned on at dusk and when all the lights of the landmark building are basically on in the night), two groups of photos of the landmark building may usually be collected as the landmark data.

For example, in the embodiments of the present disclosure, the camera may be an electronic device or system having a camera and a display interface (for displaying pictures when photo-taking), including but not limited to smart phones, tablet computers, and digital cameras, etc. For example, the above-mentioned electronic device generally has two modes, i.e., landscape photo-taking (the corresponding camera picture is shown in FIG. 4) and portrait photo-taking (the corresponding camera picture is shown in FIG. 5). In the process of collecting the landmark data, the above two modes may be selected or switched as required. For example, at each collection point, a mode in which the imaging of the landmark building may occupy a larger ratio of the camera picture is usually selected for photo-taking.

For example, in the embodiments of the present disclosure, when a photo of the landmark building is taken by the camera at each collection point, the imaging of the landmark building may be enabled to be located in a central area of the camera picture, so as to achieve a better photo-taking effect. For example, in some examples, when a photo of the landmark building is taken by the camera at each collection point, in the camera picture, the distances between the imaging of the landmark building and two edges of the camera picture in the first direction are approximately equal to each other, and at the same time, the distances between the imaging of the landmark building and two edges of the camera picture in the second direction are approximately equal to each other.

For example, the landmark data collected according to the collection method provided by the embodiments of the present disclosure may be used for 3D reconstruction to obtain a 3D model of the landmark building. For example, the 3D model may be used to achieve the landmark AR special effects, but not limited thereto. Since a main application scenario of the landmark AR special effects is shooting short videos, when the landmark data are collected, the photo-taking configuration of the camera may be kept similar with or substantially the same as the short video shooting configuration of the camera, so that the landmark AR special effects may achieve more optimal results. For example, in the collection method provided by the embodiments of the present disclosure, when a photo of the landmark building is taken by the camera, the flash and the live function of the camera may be turned off, and the high dynamic range imaging (High Dynamic Range, HDR for short) function of the camera may be turned on, so that the photo-taking configuration of the camera may be kept similar with or substantially the same as the short video shooting configuration of the camera.

It should be noted that, in the embodiments of the present disclosure, the process of the above-mentioned landmark data collection method may include more or less operations, and these operations may be performed sequentially or in parallel. Although the process of the landmark data collection method as described above includes a plurality of operations in a specific order, it should be clearly understood that the order of the plurality of operations is not limited. The above-described landmark data collection method may be performed once, or may be performed multiple times according to a predetermined condition (for example, step S100 may be performed only once, and step S200 may be performed multiple times under different conditions).

With the landmark data collection method according to the embodiments of the present disclosure, the landmark data of the landmark building may be collected based on three basic collection points respectively in a short range, a medium range, and a long range respectively, and 3D reconstruction is performed using the landmark data, which may improve the modeling effect. In addition, since the collected landmark data are in order, compared with using arbitrary obtained or collected chaotic and disordered landmark data, using the ordered landmark data for the 3D reconstruction may improve the modeling efficiency.

Figure 6:
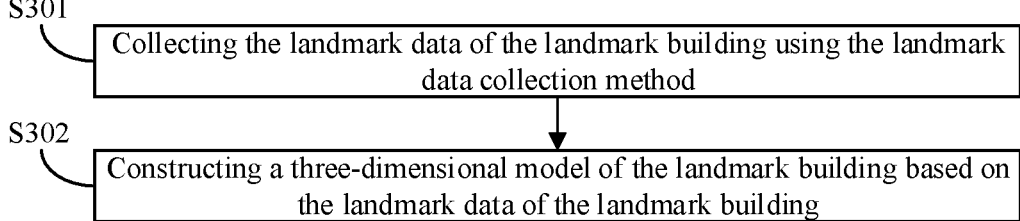
FIG. 6 is a flowchart of a landmark building modeling method according to at least one embodiment of the present disclosure.

At least one embodiment of the present disclosure also provides a landmark building modeling method. FIG. 6 is a flowchart of a landmark building modeling method according to at least one embodiment of the present disclosure. For example, as shown in FIG. 6, the image processing method includes steps S301 to S302.

In step S301, the landmark data of the landmark building are collected using the landmark data collection method according to the embodiments of the present disclosure.

For example, the landmark data collection method according to the embodiments of the present disclosure may refer to the foregoing related descriptions, which will not be repeated here. For example, the landmark data of the landmark building include: the photos of the landmark building collected based on each of the first basic collection point, the second basic collection point, and the third basic collection point (the photos collected based on each basic collection point are a set of photos). For example, in some embodiments, the landmark data of the landmark building includes a group of photos, which includes three sets of photos respectively corresponding to the three basic collection points (i.e., the first basic collection point, the second basic collection point, and the third basic collection point). For example, in some other embodiments, the landmark data of the landmark building include multiple groups of photos under different conditions (e.g., at daytime and at night, etc.), where each group of photos includes three sets of photos respectively corresponding to the three basic collection points (i.e., the first basic collection point, the second basic collection point, and the third basic collection point).

In step S302, a 3D model of the landmark building is constructed based on the landmark data of the landmark building.

For example, a 3D reconstruction algorithm may be used to sequentially process the photos of the landmark building collected based on the first basic collection point, the photos of the landmark building collected based on the second basic collection point, and the photos of the landmark building collected based on the third basic collection point, to construct the 3D model of the landmark building. For example, the principles and details of the above-mentioned 3D reconstruction algorithms may refer to common 3D reconstruction methods, such as a SFM-based 3D reconstruction method, or a deep learning-based 3D reconstruction method etc., which are not limited in the embodiments of the present disclosure.

For example, in some embodiments, in a case where the landmark data of the landmark building include one group of photos, three sets of photos in the short range, the medium range, and the long range may be sequentially processed using the 3D reconstruction algorithm to construct a 3D model of the landmark building. Of course, the above three sets of photos may be processed in a different order, which is not limited in the embodiment of the present disclosure.

For example, in some other embodiments, in a case where the landmark data of the landmark building include multiple groups of photos, each group of photos may be sequentially processed (the processing may refer to the aforementioned example in which the landmark data of the landmark building include one group of photos) using the 3D reconstruction algorithm to construct a 3D model of the landmark building; or each group of photos may be processed (the processing may refer to the aforementioned example in which the landmark data of the landmark building include one group of photos) using the 3D reconstruction algorithm to construct multiple 3D models of the landmark building, for example, to further obtain a final 3D model by fusing the multiple 3D models.

For example, in some embodiments, the operation of processing the photos of the landmark building collected based on the i-th (i=1, 2, 3) basic collection point using the three-dimensional reconstruction algorithm includes: processing, in an order where the photos of the landmark building are collected based on the i-th basic collection point, the photos of the landmark building collected based on the i-th basic collection point sequentially using the 3D reconstruction algorithm. In the embodiments of the present disclosure, the photos of the landmark building collected based on the i-th basic collection point constitutes an ordered photo sequence, and the adjacent photos have a larger overlap area between each other, which is beneficial to improve the processing rate of the 3D reconstruction algorithm.

It should be noted that, in the embodiments of the present disclosure, the 3D reconstruction algorithm may be implemented by means of software, hardware, firmware, or any combination thereof, so as to perform the corresponding processing processes.

The technical effects of the landmark building modeling method according to the embodiments of the present disclosure may refer to the corresponding description of the technical effects of the landmark data collection method in the foregoing embodiments, which will not be repeated here.

For the present disclosure, it should be noted that:

(1) in the drawings of the embodiments of the present disclosure, only the structures involved in the embodiments of the present disclosure are involved, and other structures may refer to general designs; and (2) the features in the same embodiment and different embodiments of the present disclosure may be combined with each other without conflict.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A landmark data collection method, comprising:

determining a first basic collection point, a second basic collection point, and a third basic collection point sequentially in an observation area of a landmark building; and collecting photos of the landmark building based on each of the first basic collection point, the second basic collection point, and the third basic collection point to obtain landmark data of the landmark building, wherein when a photo of the landmark building is taken by a camera at the first basic collection point, in a camera picture, at least one of a first ratio, of a size of imaging of the landmark building in a first direction to a size of the camera picture in the first direction, or a second ratio, of a size of the imaging of the landmark building in a second direction to a size of the camera picture in the second direction, is greater than or equal to 85%, when a photo of the landmark building is taken by the camera at the second basic collection point, in the camera picture, a ratio of a size of imaging of the landmark building in the first direction to the size of the camera picture in the first direction is approximately 45% to 55% of the first ratio, and the third basic collection point is approximately a midpoint between the first basic collection point and the second basic collection point, wherein said collecting the photos of the landmark building based on the i-th basic collection point comprises:

taking a photo of the landmark building by the camera at the i-th basic collection point; and moving the camera in at least one of a counterclockwise direction or a clockwise direction in the observation area, with the i-th basic collection point being a starting point; and determining a collection point at every predetermined distance interval, and taking a photo of the landmark building by the camera at the collection point, until the camera is moved out of the observation area, wherein during the movement of the camera, the camera faces the landmark building, and in the camera picture, a ratio of a size of imaging of the landmark building in the first direction to the size of the camera picture in the first direction remains substantially unchanged, where i=1, 2, 3.

2. The collection method of claim 1, wherein when the photo of the landmark building is taken by the camera at each of the first basic collection point, the second basic collection point, and the third basic collection point, the camera faces substantially right to a main identification part of the landmark building, and in the camera picture, the imaging of the landmark building comprises imaging of the main identification part.

3. The collection method of claim 1, wherein the first direction is substantially in parallel to a height direction of the imaging of the landmark building in the camera picture, and the second direction is substantially in parallel to a width direction of the imaging of the landmark building in the camera picture.

4. The collection method of claim 3, wherein the first direction is a vertical direction of the camera picture, and the second direction is a horizontal direction of the camera picture.

5. The collection method of claim 1, wherein the observation area is not a 360-degree observation area, and said moving the camera in at least one of the counterclockwise direction or the clockwise direction in the observation area, with the i-th basic collection point being the starting point; and determining the collection point at every predetermined distance interval, and taking the photo of the landmark building by the camera at the collection point, until the camera is moved out of the observation area comprises:

moving the camera in each of the counterclockwise direction and the clockwise direction in the observation area, with the i-th basic collection point being the starting point; and determining the collection point at every predetermined distance interval, and taking the photo of the landmark building by the camera at the collection point, until the camera is moved out of the observation area.

6. The collection method of claim 1, wherein the observation area is a 360-degree observation area, and said moving the camera in at least one of the counterclockwise direction or the clockwise direction in the observation area, with the i-th basic collection point being the starting point; and determining the collection point at every predetermined distance interval, and taking the photo of the landmark building by the camera at the collection point, until the camera is moved out of the observation area comprises:

moving the camera in the counterclockwise direction or the clockwise direction in the observation area, with the i-th basic collection point being the starting point; and determining the collection point at every predetermined distance interval, and taking the photo of the landmark building by the camera at the collection point, until the camera is moved back to the i-th basic collection point.

7. The collection method of claim 1, wherein in the process of collecting the photos of the landmark building based on the i-th basic collection point, photos collected at two adjacent collection points have at least an 80% overlap area between each other.

8. The collection method of claim 1, wherein in the process of collecting the photos of the landmark building based on the i-th basic collection point, in response to that the landmark building is unable to be captured completely in one photo taken by the camera at any collection point, a plurality of photos are taken of the landmark building by rotating the camera at the collection point to capture the landmark building completely, wherein any two consecutive photos in the plurality of photos of the landmark building have at least a 50% overlap area between each other.

9. The collection method of claim 8, wherein in the process of collecting the photos of the landmark building based on the i-th basic collection point, in a case where a photo X1 of the landmark building is collected at one of two adjacent collection points, and a plurality of photos of the landmark building are collected at the other one of the two adjacent collection points, at least one photo X2 in the plurality of photos of the landmark building collected at the other one of the two adjacent collection points has at least an 80% overlap area with the photo X1.

10. The collection method of claim 8, wherein in the process of collecting the photos of the landmark building based on the i-th basic collection point, in a case where a plurality of photos of the landmark building are collected at each of two adjacent collection points, at least one photo X1 in the plurality of photos of the landmark building collected at one of the two adjacent collection points and at least one photo X2 in the plurality of photos of the landmark building collected at the other one of the two adjacent collection points have at least an 80% overlap area between each other.

11. The collection method of claim 1, wherein in the process of collecting the photos of the landmark building based on the i-th basic collection point, the predetermined distance interval is an equal distance interval or an unequal distance interval.

12. The collection method of claim 1, wherein in the process of collecting the photos of the landmark building based on the i-th basic collection point, a center point of the landmark building is taken as a vertex O, and an angle $\angle$POQ formed by any two adjacent collection points P and Q and the vertex O ranges from 1 degree to 1.5 degree.

13. The collection method of claim 1, wherein in a case where a ratio of an illuminance of a light of the landmark building itself to an illuminance of sunlight is smaller than 0.5, the photos of the landmark building are collected based on the i-th basic collection point once every predetermined time interval, where i=1, 2, 3.

14. The collection method of claim 1, wherein in a case where a ratio of an illuminance of a light of the landmark building itself to an illuminance of ambient light is greater than 0.8 but smaller than 1.2, the photos of the landmark building are collected based on the i-th basic collection point, where i=1, 2, 3; and in a case where the ratio of the illuminance of the light of the landmark building itself to the illuminance of the ambient light is greater than 2, the photos of the landmark building are collected based on the i-th basic collection point, where i=1, 2, 3.

15. The collection method of claim 1, wherein during the collection of the landmark data of the landmark building, a flash and a live function of the camera are kept off.

16. The collection method of claim 1, wherein during the collection of the landmark data of the landmark building, a high dynamic range imaging function of the camera is kept on.

17. A landmark building modeling method, comprising:

collecting the landmark data of the landmark building using the landmark data collection method according to claim 1, wherein the landmark data of the landmark building comprise the photos of the landmark building collected based on each of the first basic collection point, the second basic collection point, and the third basic collection point; and constructing a three-dimensional model of the landmark building based on the landmark data of the landmark building.

18. The modeling method of claim 17, wherein said constructing the three-dimensional model of the landmark building based on the landmark data of the landmark building comprises:

processing the photos of the landmark building collected based on the first basic collection point, the photos of the landmark building collected based on the second basic collection point, and the photos of the landmark building collected based on the third basic collection point sequentially using a three-dimensional reconstruction algorithm to construct the three-dimensional model of the landmark building.

19. The modeling method of claim 18, wherein said processing the photos of the landmark building collected based on the i-th basic collection point using the three-dimensional reconstruction algorithm comprises:

processing, in an order where the photos of the landmark building are collected based on the i-th basic collection point, the photos of the landmark building collected based on the i-th basic collection point sequentially using the three-dimensional reconstruction algorithm to construct the three-dimensional model of the landmark building.

\* \* \* \* \*